US011415044B2

(12) United States Patent
Kupratis et al.

(10) Patent No.: US 11,415,044 B2
(45) Date of Patent: Aug. 16, 2022

(54) MULTI-ENGINE ARCHITECTURE WITH LINKAGES TO MULTIPLE SPOOLS

(71) Applicant: United Technologies Corporation, Farmington, CT (US)

(72) Inventors: Daniel Bernard Kupratis, Wallingford, CT (US); Neil Terwilliger, Meriden, CT (US); Christopher J. Hanlon, Sturbridge, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 410 days.

(21) Appl. No.: 16/431,271

(22) Filed: Jun. 4, 2019

(65) Prior Publication Data
US 2020/0032702 A1    Jan. 30, 2020

Related U.S. Application Data

(60) Provisional application No. 62/686,853, filed on Jun. 19, 2018.

(51) Int. Cl.
*F02C 3/06* (2006.01)
*F02C 6/06* (2006.01)
*F02C 7/36* (2006.01)
*F02C 7/32* (2006.01)

(52) U.S. Cl.
CPC ............... *F02C 3/064* (2013.01); *F02C 6/06* (2013.01); *F02C 7/32* (2013.01); *F02C 7/36* (2013.01); F05D 2220/323 (2013.01); F05D 2220/50 (2013.01)

(58) Field of Classification Search
CPC ...... F02C 6/02; F02C 6/08; F02C 6/06; F02C 7/32; F02C 7/36; F02C 7/275; F02C 9/18; F02C 3/064; F05D 2220/50; F05D 2220/323
See application file for complete search history.

(56) References Cited

U.S. PATENT DOCUMENTS

| 3,965,673 | A | 6/1976 | Friedrich |
| 4,541,237 | A | 9/1985 | Dickey |
| 6,971,241 | B2* | 12/2005 | Critchley ................. F02C 6/00 60/776 |
| 7,464,533 | B2* | 12/2008 | Wollenweber ............ F02C 6/02 60/39.15 |
| 8,205,429 | B2 | 6/2012 | Wollenweber |
| 9,099,882 | B2 | 8/2015 | Lammers et al. |
| 9,410,478 | B2 | 8/2016 | Loebig et al. |
| 9,429,077 | B2 | 8/2016 | Morgan |
| 2005/0210863 | A1* | 9/2005 | Wollenweber ............ F02C 6/08 60/224 |
| 2007/0267540 | A1* | 11/2007 | Atkey .................... B64D 13/06 244/58 |
| 2011/0089691 | A1* | 4/2011 | Jones ...................... F01D 15/10 290/43 |

(Continued)

*Primary Examiner* — Todd E Manahan
*Assistant Examiner* — Rodolphe Andre Chabreyrie
(74) *Attorney, Agent, or Firm* — Kinney & Lange, P.A.

(57) ABSTRACT

An aircraft gas turbine engine system comprises first and second gas turbine engines. The first gas turbine engine has first and second spools. A first power linkage connects the second gas turbine engine to the first spool of the gas turbine engine, and a second power linkage connects the second gas turbine engine to the second spool of the first gas turbine engine.

16 Claims, 2 Drawing Sheets

(56) References Cited

U.S. PATENT DOCUMENTS

| | | | |
|---|---|---|---|
| 2012/0153076 A1* | 6/2012 | Burns | B64D 41/00 244/58 |
| 2015/0122944 A1* | 5/2015 | Dauriac | F02C 7/277 244/58 |
| 2017/0145925 A1* | 5/2017 | Kusumi | F02C 6/18 |
| 2017/0226934 A1 | 8/2017 | Robic et al. | |
| 2018/0003072 A1 | 1/2018 | Lents et al. | |

* cited by examiner

MULTI-ENGINE ARCHITECTURE WITH LINKAGES TO MULTIPLE SPOOLS

CROSS-REFERENCE TO RELATED APPLICATION(S)

This application claims the benefit of U.S. Provisional Application No. 62/686,853 filed Jun. 19, 2018 for "Multi-Engine Architecture with Linkages to Multiple Spools" by D. Kupratis, N. Terwilliger, and C. Hanlon, which is herein incorporated by reference. U.S. Provisional Application Nos. 62/719,375 and 62/680,843, filed Aug. 17, 2018 and Jun. 5, 2018, respectively, are also incorporated by reference.

BACKGROUND

The present disclosure relates generally to multiple engine gas turbine systems, and more particularly to systems wherein multiple power linkages connect spools of primary and secondary engines.

Multi-spool gas turbine engines include successive stages of compressors and turbines in flow series. Conventional aircraft systems often include multiple engines, including both propulsion engines that generate lift, and auxiliary power units (APUs) that provide additional power and airflow for onboard systems. These engines are conventionally independent, with each engine having its own isolated airflow and mechanical loads.

SUMMARY

In one embodiment, an aircraft gas turbine engine system includes first and second gas turbine engines. The first gas turbine engine has first and second spools. A first power linkage connects the second gas turbine engine to the first spool of the gas turbine engine, and a second power linkage connects the second turbine engine to the second spool of the gas turbine engine.

In another embodiment, a method is presented for operating a system of gas turbine engines including first and second engines. In this system, a first spool of the first engine is boosted by a first power linkage connecting the first and second engines, while a second spool of the first engine is boosted by a separate second power linkage connecting the first and second engines.

The present summary is provided only by way of example, and not limitation. Other aspects of the present disclosure will be appreciated in view of the entirety of the present disclosure, including the entire text, claims, and accompanying figures.

Figure 1:
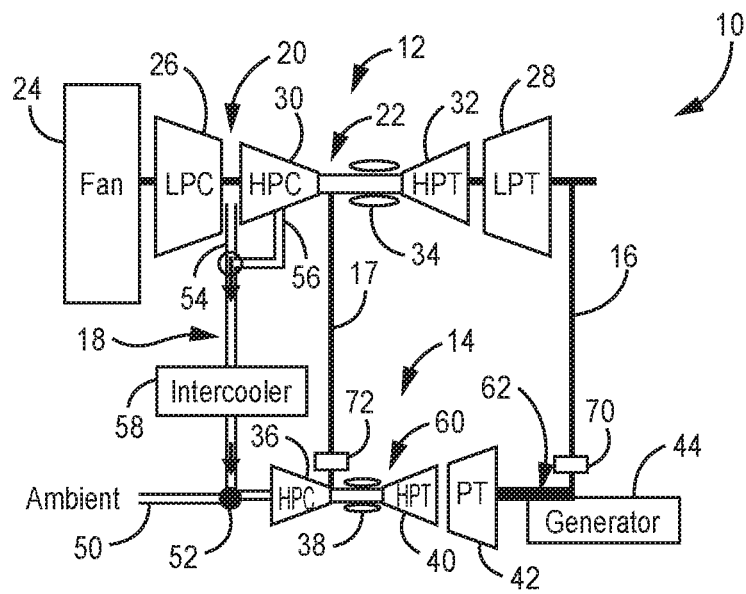
FIG. 1 is a schematic diagram of a multi-engine system including a primary multi-spool engine boosted by multiple linkages to a secondary engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure concerns a system of interconnected gas turbine engines. In the simplest of these systems, a primary multi-spool engine is connected via two power linkages to a secondary engine. Low- and high-pressure spools of the primary engine are separately boosted via these power linkages, which can be mechanical or electrical in nature. These linkages transfer power from the secondary engine to the primary, and can be independently tuned or controlled to differently boost the low- and high-pressure spools of the primary engine to avoid stall conditions, compensate for differing rates of deterioration and/or damage to engine components, and drive the primary engine fan and low-pressure compressor with reduced demand for high-pressure spool speed.

FIG. 1 is a schematic diagram of a multi-engine system 10, which includes primary engine 12 and secondary engine 14. Primary and secondary engines 12 and 14 are gas turbine engines. In some embodiments, primary engine 12 can be an aircraft propulsion engine, and secondary engine 14 can be an aircraft auxiliary power unit (APU). In alternative embodiments, primary engine 12 and secondary engine 14 can both be propulsion engines. Primary engine 12 and secondary engine 14 are interconnected by power linkages 16 and 17, and by inter-engine airflow channel 18.

In the illustrated embodiment, primary engine 12 is a two-spool engine having a low spool 20 and a high spool 22. More generally, however, the present disclosure is relevant to any primary engine 12 with at least two spools. Low spool 20 carries fan 24, low pressure compressor (LPC) 26, and low pressure turbine (LPT) 28. High spool 22 carries high pressure compressor (HPC) 30 (proximately downstream of LPC 26) and high pressure turbine (HPT) 32 (upstream of LPT 28). Primary engine 12 is a Brayton cycle engine wherein a mixture of fuel with compressed air through LPC 26 and HPC 30 is ignited in combustor 34, thereby driving HPT 32 and LPT 28, as generally understood in the art.

Like primary engine 12, secondary engine 14 is a gas turbine engine. In the illustrated embodiment, secondary engine 14 includes HPC 36, combustor 38, HPT 40, and power turbine (PT) 42. In the depicted embodiment, HPC 36 and HPT 40 are situated on main spool 60, while PT 42 is situated on a rotationally independent power spool 62. In this embodiment, PT 42 drives generator 44, a peripheral load providing onboard power generation. In alternative embodiments, however, generator 44 can be driven directly by HPT 40, without any separate PT 42 or power shaft 62. Secondary engine 14 can provide power to a range of peripheral aircraft functions independent from propulsion or from the operation of primary engine 12. For example, secondary engine 14 can be used for power generation, for cabin air circulation, and/or to drive mechanical actuation of aircraft components. Generator 44 is a rotary electrical generator driven by secondary engine 14. Although generator 44 is depicted as situated axially adjacent PT 42, generator 44 can more generally have any form capable of producing electrical power from secondary engine 14. Generator 44 can, for example, be driven from secondary engine by an intervening gear assembly, or can be integrated into a structure or case of secondary engine 14.

Primary engine 12 and secondary engine 14 are connected by power linkages 16 and 17. While secondary engine 14 is active, power linkage 16 permits power from secondary engine 14 to boost low spool 20 of primary engine 12, and power linkage 17 permits power from secondary engine 14 to boost high spool 22 of primary engine 12. Power linkages 16 and 17 are herein illustrated schematically, and can comprise mechanical and/or electrical linkages. Mechanical embodiments of linkages 16 and/or 17 include towershafts mechanically (i.e. rotationally) coupling engines 12 and 14. Electrical embodiments of linkages 16 and/or 17 include generator/motor combinations as discussed in greater detail below with respect to FIG. 2. In the illustrated embodiment, generator 44 is depicted as separate from linkage 16, In embodiments discussed below with respect to FIGS. 2 and 3, generator 44 can be an element of linkage 16, extracting power from engine 14 (e.g. from power spool 62) that is supplied to a motor disposed to drive at least one spool of primary engine 12.

Regardless of embodiment, power linkage 16 connects secondary engine 14 to low spool 20 of primary engine 12, while power linkage 17 connects secondary engine 14 to high spool 22 of primary engine 12. Power linkage 16 and 17 are at least capable of transmitting power from secondary engine 14 to primary engine 12, i.e. of boosting primary engine 12 with power extracted from secondary engine 14. In some embodiments power linkages 16 and/or 17 can be two-way linkages that permit power transfer from primary engine 12 to secondary engine 14, as well. In the depicted embodiment, linkage 17 connects high spool 22 to main spool 60, while linkage 16 connects low spool 20 to power spool 62. More generally, linkages 16 and 17 can be of any configuration capable of separately and independently providing power to spools 20 and 22 of primary engine 12.

Mechanical embodiments of linkages 16 and/or 17 can include gear assemblies 70 and 72, respectively, as illustrated schematically in FIG. 1. Although gear assemblies 70 and 72 are shown as situated proximate to secondary engine 14, they may in fact be disposed anywhere along linkages 16 and 17, respectively, between spools 22/20 and 60/62. Gear assemblies 70 and 72 can, for example, be simple clutches disposed to connect and disconnect linkages 16 and/or 17 from either engine, thereby halting power transfer. Alternatively or additionally, gear assemblies 70 and/or 72 can include gear connections selected to provide an appropriate speed ratio. Some embodiments of gear assemblies 70 and 72 can include variable speed gearing that permits adjustment of speed ratio between spools 22/20 and 60/62 of primary and secondary engines 12 and 14. In some embodiments, gear assemblies 70 and 72 can constitute extended gearing situated at the interfaces of towershafts of linkages 16 and 17 with spools of both primary and secondary engines 12 and 14.

Power linkage 16 transmits power from secondary engine 14 to low spool 20 of primary engine 12. Boosting low spool 20 increases exit pressure and output throughput of LPC 26, such that the output airflow of LPC 26 can exceed a maximum airflow intake of adjacent HPC 30. In some embodiments, system 10 can include inter-engine gas path 18, which diverts a portion of the primary pressurized airflow downstream of LPC 26 to an inlet of secondary engine 14, thereby simultaneously supercharging secondary engine 14 and alleviating potential overpressure at the intersection of LPC 26 and HPC 30. In the illustrated embodiment, inter-engine gas path 18 can receive bleed air from primary engine 12 at a range of bleed locations, either alternatively or cumulatively, including at inter-compressor bleed 54 and HPC bleed 56. Inter-compressor bleed 54 diverts a portion of the output airflow of LPC 26 to inter-engine gas path 18 before it can enter HPC 30. HPC bleed 56 can, for example, supplement inter-compressor bleed 54 to further redirect airflow within HPC 30 to prevent a mismatch of LPC 26 output airflow and HPC 30 throughput capacity. In the illustrated embodiment, intercooler 58 is disposed along inter-engine gas path 18 to cool hot air bled form primary engine 12 before supplying that bleed air to secondary engine 14. Although embodiments illustrated herein show intercoolers, these intercoolers can be omitted where temperature tolerances for secondary engine compressor and inlet sections (e.g. HPC 36 of secondary engine 14) permit direct acceptance of hot bleed air. Secondary engine 14 can receive intake airflow from an ambient air source 50 or from inter-engine gas path 18, as selected by switch 52.

In some embodiments, inter-engine gas path 18 can be omitted, and the alleviation of potential overpressure accomplished purely by simultaneously boosting of HPC 30 via power linkage 17. In the illustrated embodiment, however, inter-engine gas path 18 and power linkage 17 cooperate to adjust output flow from LPC 26 and input flow into HPC 30 so as to prevent an overpressure event at the intersection of LPC 26 and HPC 30 that could introduce a risk of stall in LPC 26.

Inter-engine gas path 18 and power linkages 16/17 permit a greater maximum thrust from engine 12 while reducing (or without increasing) turbine operating temperature at engine 12. Fuel flow in engine 12 is accordingly reduced, while fuel flow in engine 14 is increased. Intercooler 58 enables turbine temperatures in engines 12 and 14 to be similar.

Figure 2:
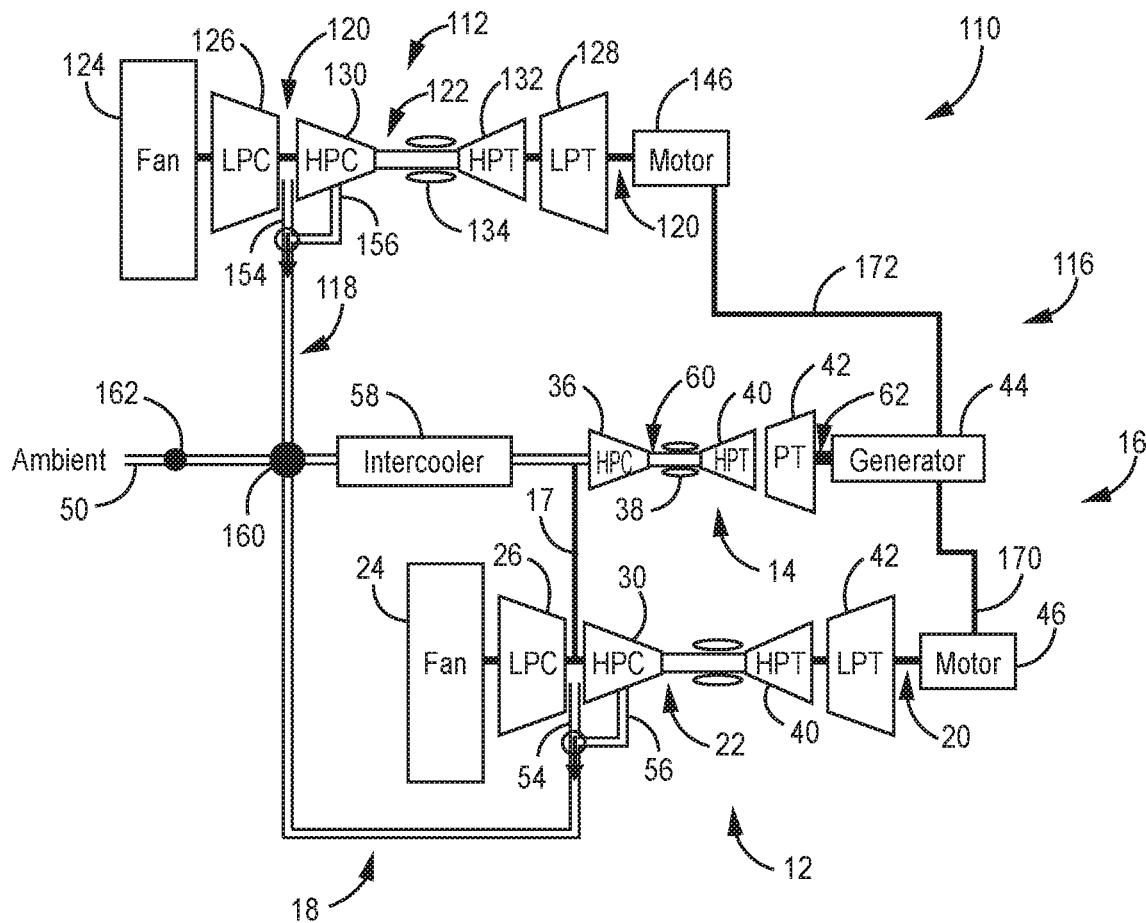
FIG. 2 is a schematic diagram of a multi-engine system including two primary multi-spool engines, one of which is boosted by multiple linkages to a secondary engine, and the other by only a single linkage to a secondary engine.

FIG. 2 is a schematic diagram of multi-engine system 110. System 110 includes engines 12 and 14 generally as described above with respect to FIG. 1, as well as an additional primary engine 112. Primary engine 112 generally parallels engine 12 in structure, but is connected to secondary engine 14 by only a single power linkage 116. Primary engine 112 includes spools 120 and 122, fan 124, LPC 126, LPT 128, HPC 130, HPT 132, combustor 134, and bleed locations 154 and 156 generally as described with respect to like-numbered elements of engine 12. In the illustrated embodiment, power linkage 17 connecting engines 12 and 14 is a mechanical (towershaft) linkage substantially as described above with respect to FIG. 1. Power linkages 16 and 116, by contrast, are depicted as electrical linkages formed via generator 44 and motors 46 and 146, respectively. Power connections 170 and 172 connect generator 44 to motors 46 and 146, respectively. Although depicted schematically as direct power connections, power supplied by generator 44 can in fact be routed by a power distribution and control system as described in greater detail with respect to FIG. 3, and need not be fed directly from generator 44 to motors 46/146. In the depicted embodiment, generator 44 is a rotational power generation device coupled to power turbine 42 via power pool 62, as described above with respect to FIG. 1. In other embodiments, however, power turbine 42 can be omitted and generator 44 directly coupled to main spool 60. Power supplied by generator 44 drives motors 46/146, thereby boosting low spools 20/120.

The embodiment illustrated in FIG. 1 is well suited to applications wherein engines 12 and 14 are located in close physical proximity, such that power linkage 17 can be a relatively short mechanical (rotational) coupling element such as a towershaft disposed between the engines. Engine 112, which is coupled to engine 14 only via an electrical connection and potentially an inter-engine gas path, can be situated more remotely from engines 12 and 14. In alternative embodiments, power linkage 17 can also be an electrical linkage (i.e. comprising a power connection permitting engine 14 to drive a motor attached to high-pressure shaft 22), thereby permitting primary engines 12 and 112 to both be located distantly from secondary engine 14.

As mentioned previously, power linkage 16 and 17 can in the most general case be either electrical or mechanical in nature. Mechanical linkages are generally more feasible between engines in close proximity to each other, and advantageously permit power transfer with minimal power loss (e.g. due to friction). Electrical linkages transfer power less efficiently, but permit more distant power transmission without the added weight or routing considerations required for cumbersome drivetrains. In addition, although mechanical linkages can be rotationally decoupled or adjusted in speed via gear assemblies such as gearboxes and/or clutches, electrical linkages provide comparatively freely adjustable power delivery. Furthermore, electrical linkages can be particularly useful in systems wherein at least one generator 44 driven by secondary engine 14 is already required to power peripheral systems, since existing generator and power-distribution architecture can be re-used and re-purposed to permit primary engine boosting. In addition, power delivered to low- and high-pressure primary engine spools 20 and 22, respectively, can be independently controlled even in single-spool embodiments of secondary engine 14, so long as at least one of linkages 16/17 is an electrical linkage.

Engine 14 can accelerate in power more rapidly than engines 12 and 112, allowing system 110 as a whole to permit faster acceleration of either or both engines 12/112 (i.e. from low power to high power) by boosting engines 12/112 through power connections 170/172. In this way, system 110 can for example accelerate engine 112 from a lower descent idle speed, especially while simultaneously closing inter-engine gas path 18, while spooling up (accelerating and increasing fuel flow rate of) engine 14 and supplying power through power connection 172. System 110 is an asymmetrical system that permits asymmetric catering to operating modes of engines 12 and 112. More specifically, system 110 caters to a low descent idle power operation (with reduced fuel consumption) for engine 112, by bleeding airflow through inter-engine gas path 18 and transmitting power via power connection 172.

Figure 3:
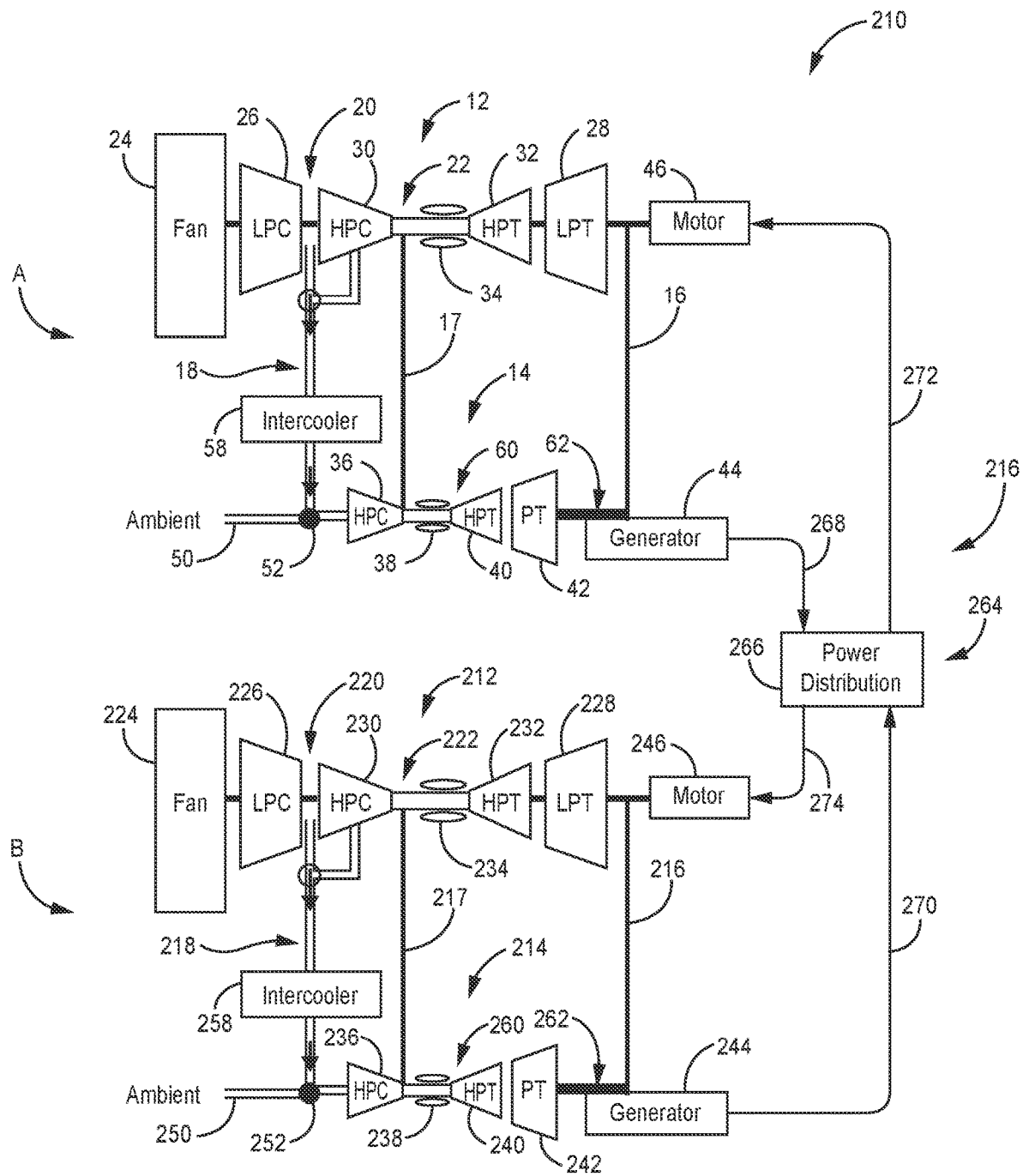
FIG. 3 is a schematic diagram of a multi-engine system including two sets of primary and secondary engines connected by multiple linkages.

FIG. 3 is a schematic diagram of multi-engine system 210, which includes semi-independent engine groups A and B, each of which generally resembles multi-engine system 10, described above with respect to FIG. 1. Engine group B includes elements identified with 2xx reference numerals. These elements generally match corresponding elements of group A, described above with respect to FIG. 1. System 210 additionally includes motors 46 and 246, and power distribution system 264, which contains power distribution controller 266 and power connections 268, 270, 272, and 274. Power distribution system 264 provides a generalized power linkage between generators 44/244 (via power connections 268 and 270) and motors 46/246 (via power connections 272 and 274), thereby permitting power transfer between engine groups A and B, such that each primary engine 12/212 can be boosted not only by its associated secondary engine 14/214, but also by the secondary engine 214/14 of the opposite group. In the embodiment of FIG. 3, power linkages 16 and 216 are optional mechanical linkages connecting power spools 62/262 to low pressure spools 20/220. Although power distribution system 264 can functionally take the place of power linkages 16/216, additional mechanical connections via power linkages 16/216 preserve the advantageously higher power transfer efficiency offered by mechanical connections, while also permitting greater adjustability in boost power via control of power delivery via power distribution controller 266. Power distribution system 264 additionally permits power from multiple generators 44/244 to be directed primarily to one or another motor 46/246, e.g. to compensate for asymmetric faults or failures in primary engines 12 or 212. Although power distribution system 264 is depicted and described herein as a form of power linkage disposed to boost low-pressure spools of engines 12/212, similarly distributed electrical linkages can be used additionally or alternatively to drive high-pressure spools.

All of the architectures disclosed herein permit simultaneous and independent boosts to multiple spools of at least one primary engine using power from a secondary engine. Power delivery to each primary engine spool can be varied to avoid stall and/or overpressure conditions that could otherwise arise if only one spool were boosted. In addition, the independent boosting of low- and high-pressure spools offered by the presently disclosed architectures permits low spool power delivery in response to sudden acceleration needs, without or with reduced demand for high spool speeds. Consequently, the present architectures enable lower HPT clearance margins while still providing required accelerations as-needed, thereby permitting improved cruising fuel efficiency.

System 210 is a symmetrical and redundant generalization of system 10. This broader system permits faster acceleration of engines 12/212 (from low power to high power) via power transfer along power linkages 16/17/216/217 and power connections 270/272. In addition, for a given required aircraft total thrust, system 210 enables asymmetry of fuel flow in engines 12 and 212, and asymmetry of combined fuel flow into each engine grouping (e.g. 12 and 14 versus 212 and 214). These asymmetries allow system 212 to cater to differences in fuel efficiency and margin in each engine. These asymmetries also enable each engine to assist the others in order to extend time-on-wing of an engine that is comparatively more deteriorated.

Discussion of Possible Embodiments

The following are non-exclusive descriptions of possible embodiments of the present invention.

An aircraft gas turbine engine system comprising: a first gas turbine engine having first and second spools; a second gas turbine engine; a first power linkage between the second gas turbine engine and the first spool of the gas turbine engine; and a second power linkage between the second gas turbine engine and the second spool of the gas turbine engine.

The aircraft gas turbine engine of the preceding paragraph can optionally include, additionally and/or alternatively, any one or more of the following features, configurations and/or additional components:

A further embodiment of the foregoing aircraft gas turbine engine system, wherein the first gas turbine engine is a propulsion engine, and the second gas turbine engine is an auxiliary power unit (APU).

A further embodiment of the foregoing aircraft gas turbine engine system, wherein the first power linkage is a rotational mechanical coupling between the second gas turbine engine and the first spool.

A further embodiment of the foregoing aircraft gas turbine engine system, wherein the rotational mechanical coupling comprises a towershaft disposed between the second gas turbine engine and the first spool.

A further embodiment of the foregoing aircraft gas turbine engine system, wherein the second power linkage is an electrical coupling comprising: a generator driven by the second gas turbine engine; and a motor coupled to the second spool and powered by the generator.

A further embodiment of the foregoing aircraft gas turbine engine system, wherein the generator is driven by a spool of the second gas turbine engine that is coupled by the first power linkage to the first spool.

A further embodiment of the foregoing aircraft gas turbine engine system, wherein the generator is driven by a power turbine of the second gas turbine engine that is rotationally isolated from the first power linkage to the first spool.

A further embodiment of the foregoing aircraft gas turbine engine system, wherein: the second gas turbine engine comprises third and fourth spools, the first power linkage connects the third spool to the first spool, and the fourth power linkage connects the fourth spool to the second spool.

A further embodiment of the foregoing aircraft gas turbine engine system, wherein the first power linkage is a mechanical rotational coupling, and the second power linkage is an electrical linkage comprising a generator powered by the second gas turbine engine, and a motor attached to the second spool, driven by the generator.

A further embodiment of the foregoing aircraft gas turbine engine system, further comprising an inter-engine gas path from a compressor of the first gas turbine engine to an inlet of the second gas turbine engine.

A further embodiment of the foregoing aircraft gas turbine engine system, further comprising: a third gas turbine engine; and a third power linkage between the second gas turbine engine and the third gas turbine engine.

A further embodiment of the foregoing aircraft gas turbine engine system, wherein the first power linkage is a mechanical rotational coupling, and the third power linkage is an electrical linkage comprising a generator powered by the second gas turbine engine, and a motor attached to a spool of the third gas turbine engine, driven by the generator.

A further embodiment of the foregoing aircraft gas turbine engine system, further comprising: a third gas turbine engine having third and fourth spools; a fourth gas turbine engine; a third power linkage between the fourth gas turbine engine and the third spool of the gas turbine engine; and a fourth power linkage between the fourth gas turbine engine and the fourth spool of the gas turbine engine.

A further embodiment of the foregoing aircraft gas turbine engine system, further comprising a fifth power linkage between the fourth gas turbine engine and the first gas turbine engine.

A further embodiment of the foregoing aircraft gas turbine engine system, wherein the fourth gas turbine engine drives a generator, and wherein the fourth and fifth power linkages comprise electrical connections between the generator and motors disposed on the second and fourth spools.

A method of operating a system of gas turbine engines including a first engine and a second engine, the method comprising: boosting a first spool of the first engine using the second engine via a first power linkage connecting the first and second engines; and boosting a second spool of the first engine using the second engine via a second power linkage connecting the first and second engines.

The method of the preceding paragraph can optionally include, additionally and/or alternatively, any one or more of the following features, configurations and/or additional components:

A further embodiment of the foregoing method, wherein boosting the first spool comprises mechanically coupling a third spool of the second engine to the first spool.

A further embodiment of the foregoing method, wherein boosting the second spool comprises: driving a generator with the second engine; coupling a motor to the second spool; and powering the motor via the generator.

A further embodiment of the foregoing method, wherein more power is generated by driving the generator than is transmitted from the generator to the motor.

A further embodiment of the foregoing method, further comprising controlling delivery of power from the generator to the motor based in part on a state the first spool.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An aircraft gas turbine engine system comprising:
a first gas turbine engine having first and second spools;
a second gas turbine engine; and
a third gas turbine engine;
wherein the first, second, and third gas turbine engines are connected such that the first and second gas turbine engines are connected by a first power linkage and a second power linkage, while the second and third gas turbine engines are connected only by a third power linkage:
the first power linkage connecting the second gas turbine engine to the first spool of the first gas turbine engine;
the second power linkage connecting the second gas turbine engine to the second spool of the first gas turbine engine; and
the third power linkage connecting the second gas turbine engine and the third gas turbine engine; and
wherein the first power linkage is a mechanical rotational coupling, and the third power linkage is an electrical linkage comprising a generator powered by the second gas turbine engine, and a motor attached to a spool of the third gas turbine engine, driven by the generator.

2. The aircraft gas turbine engine system of claim 1, wherein the first gas turbine engine is a propulsion engine, and the second gas turbine engine is an auxiliary power unit (APU).

3. The aircraft gas turbine engine system of claim 1, wherein the rotational mechanical coupling comprises a towershaft disposed between the second gas turbine engine and the first spool.

4. The aircraft gas turbine engine system of claim 1, wherein the second power linkage is an electrical coupling comprising:
the generator driven by the second gas turbine engine; and a motor coupled to the second spool and powered by the generator.

5. The aircraft gas turbine engine system of claim 4, wherein the generator is driven by a spool of the second gas turbine engine that is coupled by the first power linkage to the first spool.

6. The aircraft gas turbine engine system of claim 4, wherein the generator is driven by a power turbine of the second gas turbine engine that is rotationally isolated from the first power linkage to the first spool.

7. The aircraft gas turbine engine system of claim 1, wherein:
the second gas turbine engine comprises a third spool and a fourth spool,
the first power linkage connects the third spool to the first spool, and
the second power linkage connects the fourth spool to the second spool.

8. The aircraft gas turbine engine system of claim 1, further comprising an inter-engine gas path from a compressor of the first gas turbine engine to an inlet of the second gas turbine engine.

9. The aircraft gas turbine engine system of claim 1, further comprising:
the third gas turbine engine having a third spool and a fourth spool;
a fourth gas turbine engine;
a fourth power linkage connecting the fourth gas turbine engine and the third spool of the third gas turbine engine; and
a fifth power linkage connecting the fourth gas turbine engine and the fourth spool of the third gas turbine engine.

10. The aircraft gas turbine engine system of claim 9, further comprising a sixth power linkage connecting the fourth gas turbine engine and the first gas turbine engine.

11. The aircraft gas turbine engine system of claim 10, wherein the fourth gas turbine engine drives a second generator, and wherein the fourth and fifth power linkages comprise electrical connections between the second generator and motors disposed on the second and fourth spools.

12. A method of operating a system of gas turbine engines including a first engine, a second engine, and a third engine, the method comprising:
boosting a first spool of the first engine using the second engine via a first power linkage connecting the first and second engines;
boosting a second spool of the first engine using the second engine via a second power linkage connecting the first and second engines;
boosting a third spool of the third engine using the second engine via a third power linkage connecting the second and third engines, the third power linkage being the only power linkage connecting the second engine and the third engine;
wherein the first power linkage is a mechanical rotational coupling, and the third power linkage is an electrical linkage comprising a generator powered by the second engine, and a motor attached to the third spool of the third engine, driven by the generator.

13. The method of claim 12, wherein boosting the first spool comprises mechanically coupling a fourth spool of the second engine to the first spool.

14. The method of claim 12, wherein boosting the second spool comprises:
driving the generator with the second engine;
coupling a second motor to the second spool; and
powering the second motor via the generator.

15. The method of claim 14, wherein more power is generated by driving the generator than is transmitted from the generator to the second motor.

16. The method of claim 15, further comprising controlling delivery of power from the generator to the second motor based in part on a state of the first spool.

* * * * *